Nov. 7, 1950 E. J. VON PEIN 2,528,926
FISHING REEL
Filed July 10, 1946 5 Sheets-Sheet 3
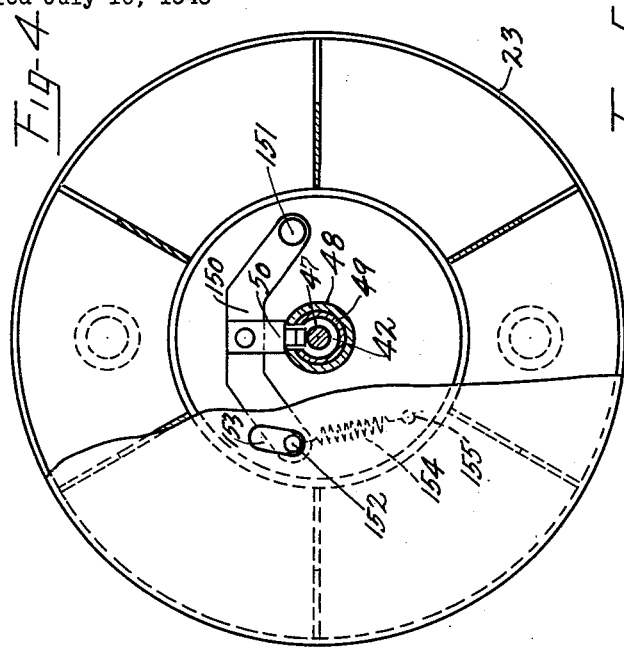
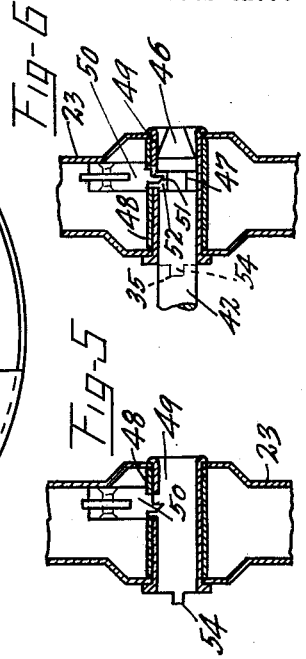
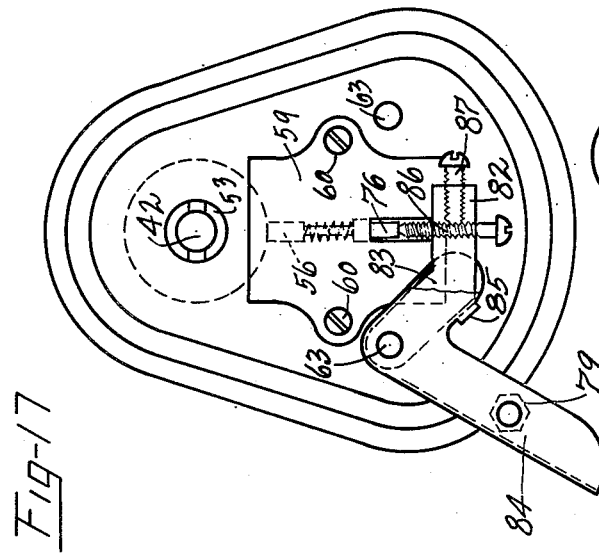
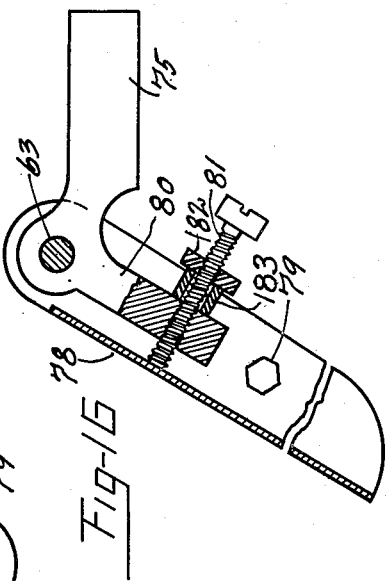
INVENTOR.
Edward J. Von Pein
BY
ATTORNEY Nov. 7, 1950          E. J. VON PEIN          2,528,926
FISHING REEL
Filed July 10, 1946          5 Sheets-Sheet 4
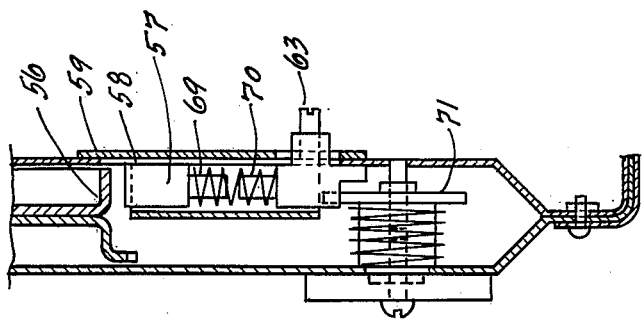
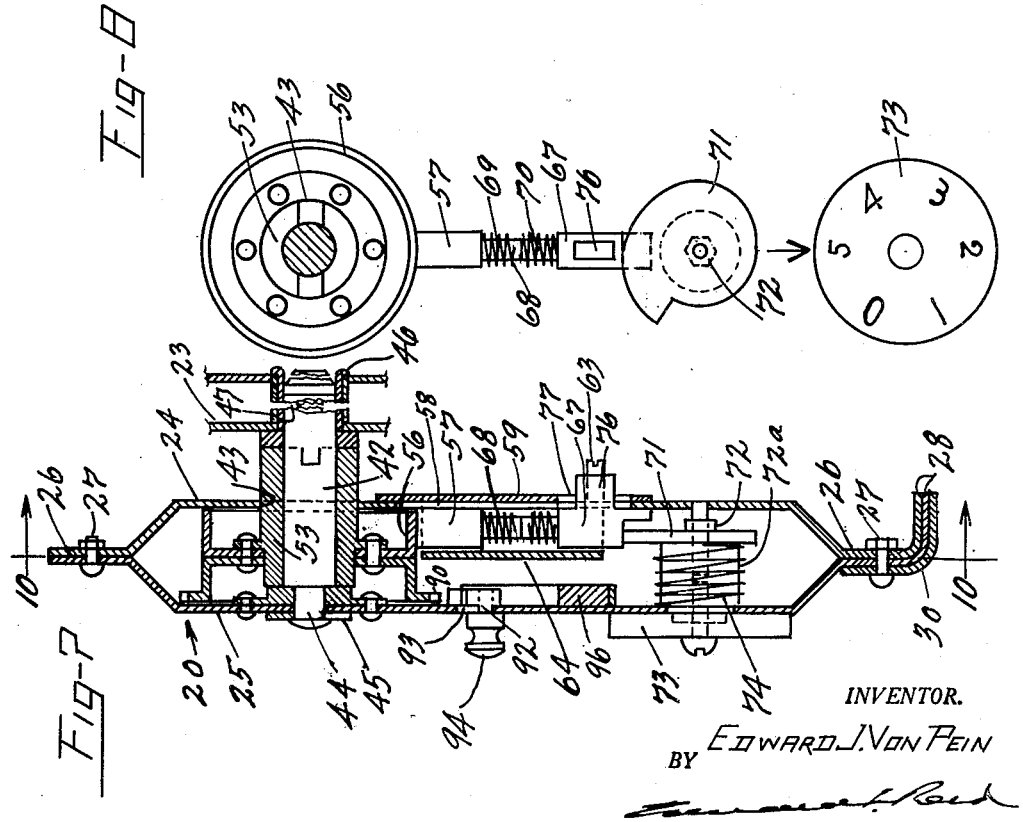
INVENTOR.
BY Edward J. Von Pein
ATTORNEY

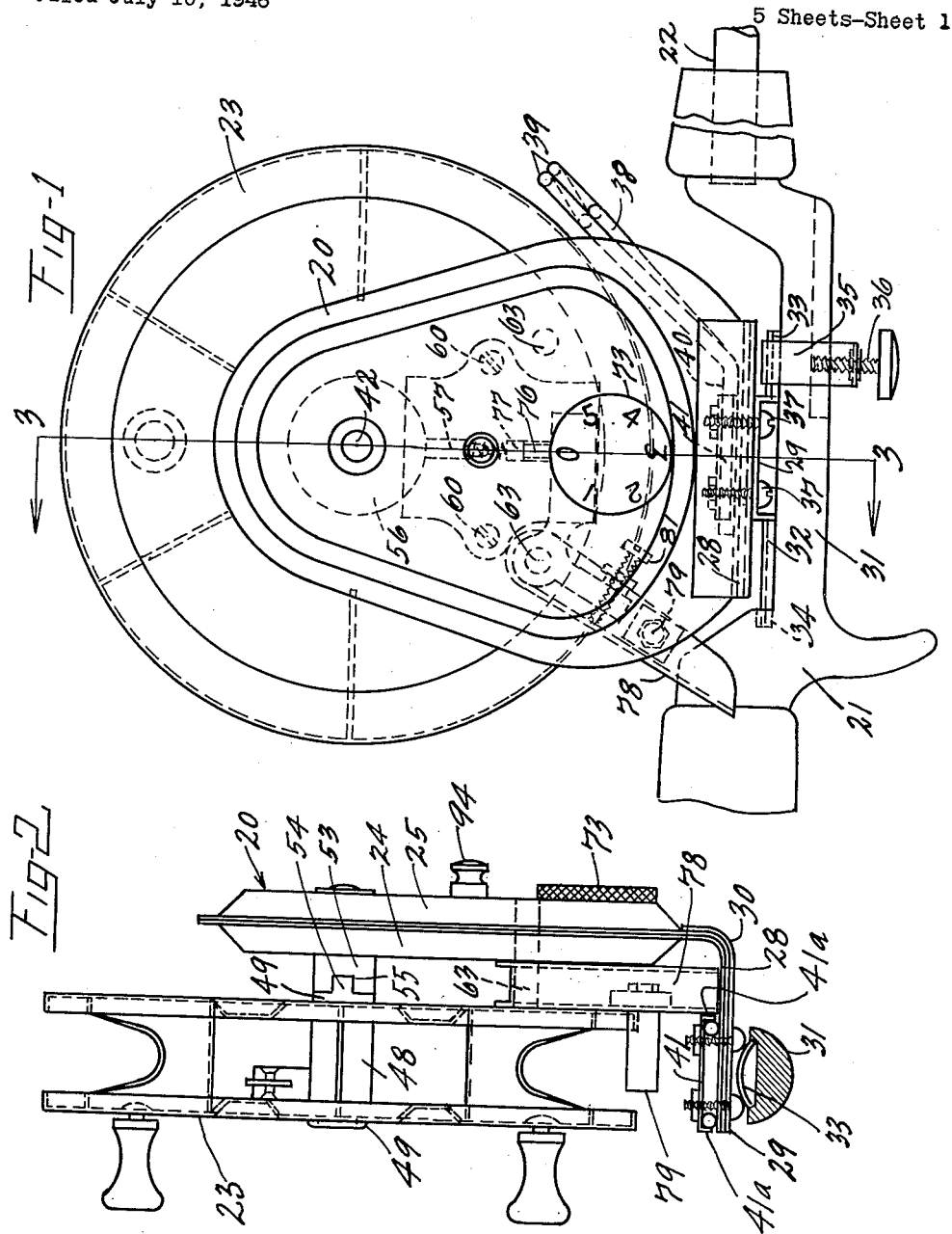

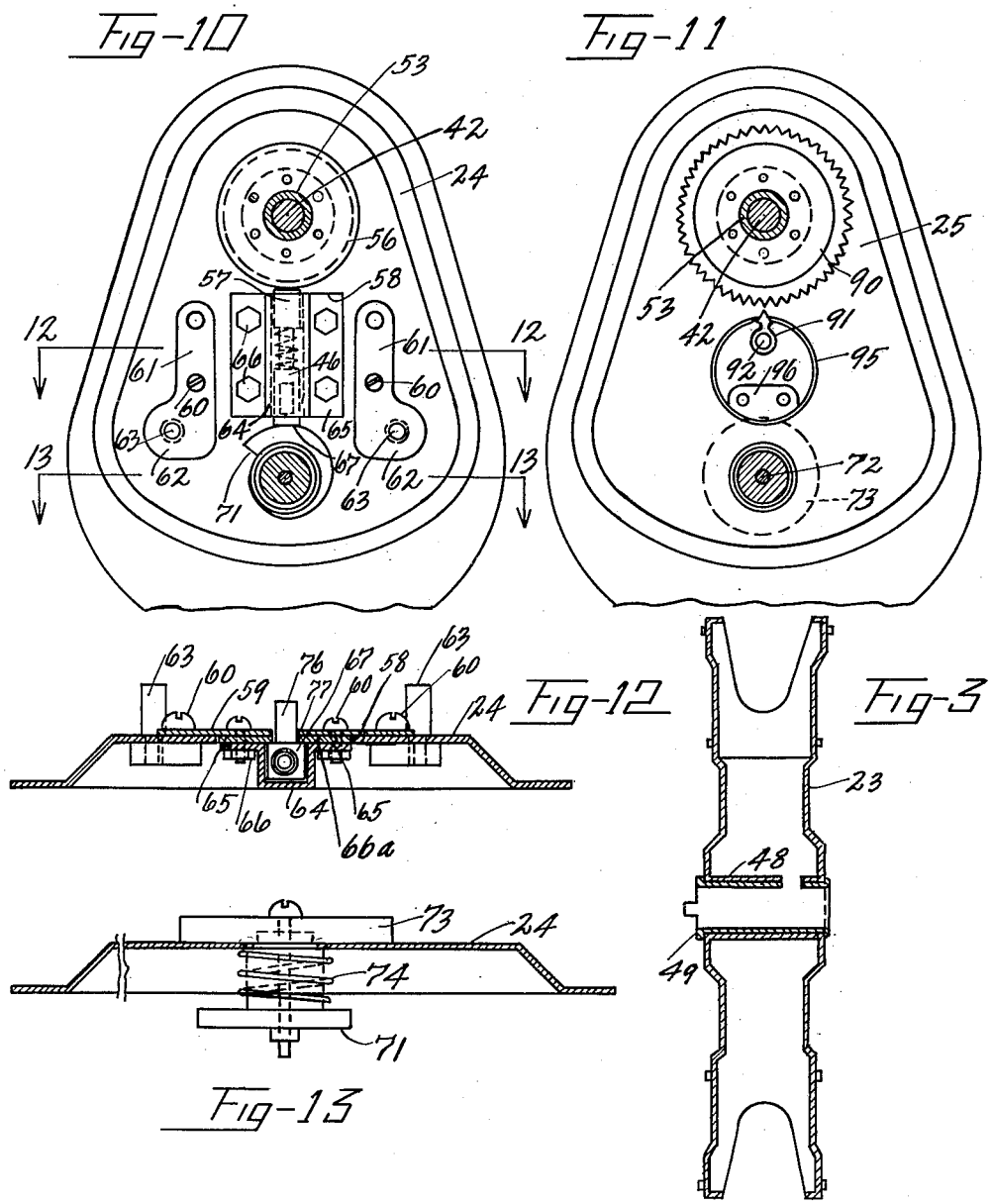

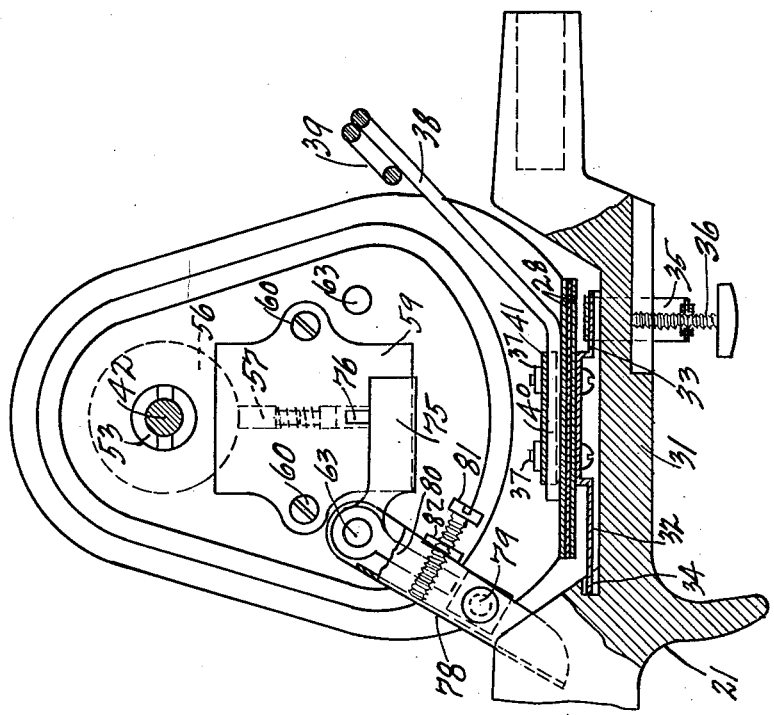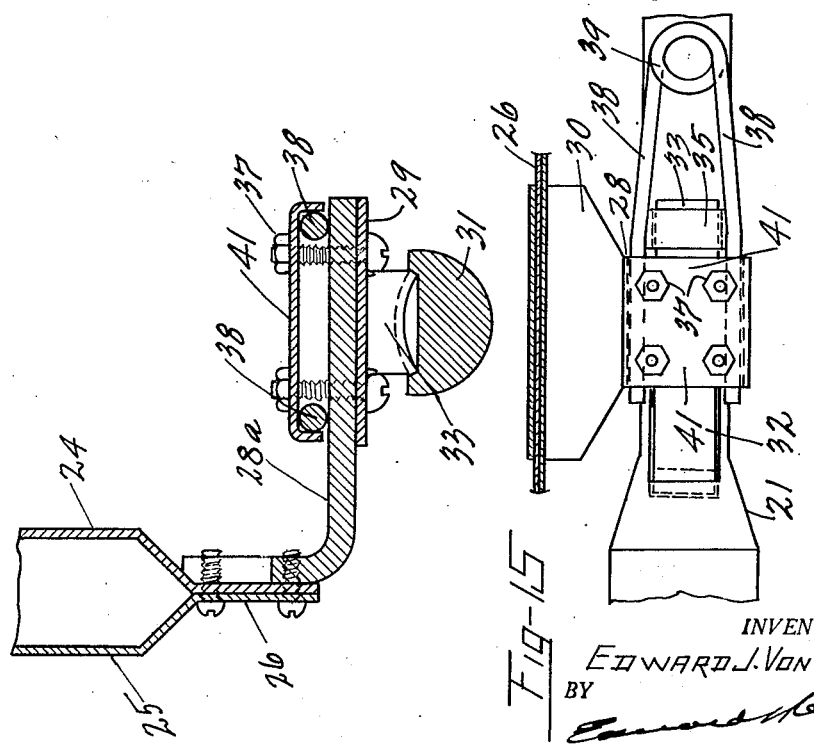

Patented Nov. 7, 1950

2,528,926

UNITED STATES PATENT OFFICE 2,528,926

FISHING REEL

Edward J. Von Pein, Dayton, Ohio

Application July 10, 1946, Serial No. 682,477

3 Claims. (Cl. 242—84.5)

This invention relates to a fishing reel and more particularly to brake mechanism for such a reel.

One object of the invention is to provide improved means for selectively controlling the paying out of the line under different fishing conditions.

A further object of the invention is to provide a simple, efficient and easily controlled brake mechanism.

A further object of the invention is to provide mechanical means for effecting what is known as "thumbing" to control the paying out of the line in certain types of fishing, which is usually accomplished by pressing the thumb of the operator on the coil of line on the spool.

A further object of the invention is to provide a brake actuating mechanism which can be quickly and accurately controlled by the thumb of the operator.

A further object of the invention is to provide a brake which may be set to provide a predetermined yieldable resistance to the paying out of the line or a positive resistance thereto.

Other objects of the invention may appear as the reel is described in detail.

In the accompanying drawings Fig. 1 is a side elevation of a reel embodying my invention, showing the same mounted on the handle of the rod; Fig. 2 is a rear elevation of the reel; Fig. 3 is a section taken centrally through the spool; Fig. 4 is a side elevation of the spool, partly broken away; Fig. 5 is a section taken axially through the hub of the spool; Fig. 6 is a similar view showing the spool mounted on the shaft; Fig. 7 is a vertical section taken through the frame showing the yieldable retarding means in operative position; Fig. 8 is a side elevation of the retarding means of Fig. 7; Fig. 9 is a sectional view of a portion of the frame showing the retarding means in its inoperative position; Fig. 10 is a section taken on the line 10—10 of Fig. 7, looking in the direction of the arrows; Fig. 11 is a similar section looking in the direction opposite the arrows; Fig. 12 is a transverse section taken on the line 12—12 of Fig. 10; Fig. 13 is a section taken on the line 13—13 of Fig. 10; Fig. 14 is an elevation of the inner side of the frame partly in section; Fig. 15 is a horizontal section through the lower portion of the frame showing the mounting mechanism and line guide in plan; Fig. 16 is a sectional detail view of the adjusting means for the thumbing lever; Fig. 17 is an elevation of the frame showing the same provided with a modified form of thumbing lever; and Fig. 18 is a sectional view of a portion of the frame showing the same provided with a modified form of supporting bracket.

In these drawings I have illustrated a preferred embodiment of the invention, together with certain minor modifications thereof, but it is to be understood that the reel as a whole, as well as the several parts thereof, may take various forms and may be assembled in various ways without departing from the spirit of the invention.

In the particular embodiment here illustrated the reel comprises a frame 20 having means whereby it may be mounted on the handle portion 21 of a fishing rod 22. A spool 23 is rotatably supported on the frame at one side thereof, the frame being offset from the handle 21 so as to position the reel directly above the latter. The spool may be of any suitable character, and as here shown is of a conventional type except for the means for rotatably supporting the same on the frame. The frame 20 may take various forms, and it is here shown as comprising upright side members 24 and 25 rigidly connected one with the other in laterally spaced relation to provide between them a space or housing in which the means for controlling the rotation of the spool may be mounted. In the present arrangement the marginal portions 26 of the walls 24 and 25 are deflected inwardly and rigidly secured in contact one with the other, as by bolts 27. The frame may be provided with any suitable means for mounting the same on the rod handle. In the arrangement shown in Figs. 2 and 7 the contacting portions 26 of the side walls 24 and 25 at the lower end of the frame are of substantial width and are bent laterally to substantially horizontal positions to form a supporting bracket 28. This bracket extends across the rod, as shown in Fig. 2, and may be detachably secured thereto in various ways. In the present arrangement the bracket 28 rests upon a supporting plate 29 which may, if desired, be extended about the bent portion of the bracket 28 to reinforce the latter, as shown at 30. Preferably the handle 21 is provided with a depressed portion 31, in front of the hand grip or rear end portion thereof, and the bracket and its supporting plate are mounted on this depressed portion of the handle. In the present instance that portion of the plate 29 which lies above the depressed portion of the handle is provided with relatively narrow portions 32 and 33 extending lengthwise of the handle. The portion 32 extends into a recess 34 at the rear end of the depressed portion 31 of the handle and the part 33 is tightly clamped to the handle, as by means of a clamping band 35 which extends about the part 33 of the plate and the depressed portion of the handle and is provided with a clamping screw 36 by means of which the part 33 of the plate may be tightly but detachably secured to the handle. By loosening the clamp 35 and slipping the same off the part 33 of the plate the rear portion 32 may be withdrawn from the recess 34 and the reel as a whole removed from the handle. As here shown the frame supporting bracket 28 is secured to the plate 29 by bolts 37, thus enabling the reel to be reversed to locate the frame on the opposite side of the handle.

In Fig. 18 there is shown a modified form of supporting bracket for the frame in which the bracket 28a is formed separate from the frame and has an upturned end which is secured to the contacting marginal portions of the housing by the same fastening devices which attach the marginal portions one to the other. This separate bracket may be of any thickness desirable to give it rigidity and is supported on the plate 29 and attached to the part 31 of the handle in the same manner as above described.

The reel is provided with a line guide which preferably is formed from a section of small diameter rod or wire which is bent upon itself to provide elongate arms 38, the rear portions of which are secured to the reel supporting structure and the forward portions of which extend forwardly and upwardly from the supporting structure. The forward ends of the arms 38 are connected one with the other to form a loop through which the line, not shown, extends. In the present instance the connected portions of the arms are bent to form a closed coil or loop 39. The rear end portions 40 of the arms are supported on the frame supporting bracket, and a clamping plate 41 having lateral flanges 41a is placed over the arms and is rigidly secured to the bracket and the supporting plate 29 by the bolts 27, which are extended through the clamping plate 41. Obviously, if the position of the frame is reversed the line guide can also be reversed so that it will extend forwardly in either position of the frame, or if it is desired, the line guide could be provided with two end portions 38 and loops 39, extending in opposite directions.

The spool 23 may be rotatably supported on the frame in any suitable manner. Preferably a stationary shaft 42 is mounted on the frame, and as here shown this shaft extends through an opening 43 in the inner wall 24 of the frame and is rigidly secured to the outer wall 25 thereof, as by extending a reduced end portion 44 of the shaft through apertures in the wall 25 and a stiffening member 45 and upsetting the end of the reduced portion of the shaft or otherwise rigidly securing the same to the wall. The outer end portion of the shaft 42 extends a substantial distance beyond the side wall 24 and is provided with a tapered end 46 and a circumferential groove 47. The spool 23 has a hub portion 48 in which is rigidly secured a bearing 49 adapted to receive the outer end portion of the stationary shaft 42. The spool is removably secured to the shaft, as by a latch 50 having a nose 51 which extends through an opening 52 in the wall of the bearing 49 and into the circumferential groove 47 in the shaft. The latch 50 is carried by a bar 150 pivotally mounted on the spool structure at 151 and having adjacent its other end a pin 152 which extends through a slot 153 in the wall of the spool and is connected by a spring 154 with a stud 155 on the wall of the spool. Thus, when it is desired to remove the spool from the shaft the pin 152 is moved upwardly and the latch withdrawn from the groove in the stationary shaft. Rotatably mounted on the shaft 42 is a tubular shaft 53 which extends through the opening 43 in the inner frame member and in the present instance abuts against the reinforcing member 45 on the outer frame member. This rotatable shaft is of such length that its outer end may be drivingly connected with the bearing 49 on the spool, as by lugs 54 on the bearing extending into recesses 55 in the end of the tubular shaft, thus causing the tubular shaft 53 to rotate with the spool when the latter rotates on the stationary shaft 42.

The rotation of the spool is controlled by braking mechanism connected with the rotatable shaft 53. This braking mechanism is carried by the frame 20, and in the present arrangement is arranged within the housing constituting the frame. In this arrangement a brake drum 56 is rigidly secured to the rotatable shaft 53 within the housing and a movable brake member cooperates with the brake drum to control the rotation of the shaft and spool. Preferably the movable brake member is in the nature of a brake shoe 57 which is slidably mounted on the adjacent wall of the frame. In the construction shown the wall 24 has an opening 58 therein which is closed by an exterior plate 59 which overlaps the wall 24 and is rigidly secured thereto by screws 60, the wall being provided on its inner surface along the sides of the opening with reinforcing bars 61 to stiffen the wall and to provide screw holes of proper depth to receive the screws 60. These reinforcing bars have enlarged lower ends 62 to receive and support studs 63 which project outwardly beyond the wall 24 for a purpose which will hereafter appear. Rigidly connected with the closure plate 59 is a channel member 64 having flanges 65 by means of which it may be connected with the closure plate, as by bolts 66, a spacer plate 66a being preferably arranged between the channel member and the closure plate to position the flanges 65 on the inner side of the wall 24. The channel 64 constitutes a guideway for the brake shoe 57 which is supported for vertical sliding movement therein.

The brake member may be actuated and the pressure on the drum controlled by mechanism of any suitable type, but preferably the controlling mechanism is such as to enable the paying out of the line to be controlled in the manner best adapted to the particular type of fishing for which the reel is being used. In the present arrangement an adjustable actuating device is provided which may be set to cause the brake member to exert on the drum a selected yieldable pressure or a positive pressure of the desired amount. There is also provided other means whereby the action of the brake member on the drum is directly controlled by the operator.

In the present construction there is slidably mounted in the lower portion of the guideway 64 a member 67, here shown as a slide block, and interposed between the member 67 and the brake shoe 57 is a compression spring 68. The brake shoe and the member 67 have cooperating parts, such as a stud 69 on the brake shoe and a stud 70 on the member 67, which are normally retained in spaced relation by the spring 68 but will be brought into direct contact to establish a positive conection between the member 67 and the brake shoe when the spring has been compressed to a predetermined extent. Thus, the initial upward movement of the member 67 causes the brake shoe to exert a yieldable pressure on the brake drum, which increases progressively until the member 67 contacts the brake shoe. After the member 67 has engaged the brake shoe further pressure exerted on the member 67 will be positively applied to the brake shoe and by the brake shoe to the drum. Any suitable means may be provided for actuating the movable member 67 and for retaining it in selected positions. In the present instance a rotatable cam 71 is supported on the frame below the member 67 with its periphery in contact with the latter. A stud 72 projects from one side of the cam and is rotatably mounted in the inner wall 24 of the housing. A cylindrical member 72a rigid with the other side of the cam has a reduced portion rotatable in the outer wall 25 of the housing, and an actuating member or knob 73 is rigidly secured to the member 72a exteriorly of the housing. The rotation of the knob rotates the cam and a spring 74 interposed between the cam and the wall of the housing exerts frictional resistance on the cam sufficient to retain it in any position to which it is moved. The knob 73 is provided with indicia, such as a series of numerals from 0 to 5, to indicate exteriorly of the housing the extent to which the spring 68 has been compressed. When the cam is in the position shown in Fig. 9 the member 67 will be in contact with the lowest or zero portion thereof, and when the cam is rotated clockwise, as in Fig. 8, the spring is gradually compressed and the compression is continued until the desired resistance is offered to the rotation of the spool. As has been stated the cam is automatically retained in this position so that the yieldable resistance remains as adjusted until the position of the cam is manually changed. When the cam is rotated far enough to effect direct connection between the member 67 and the brake shoe, in the present instance to 5 on the knob, the member 67 will have positive connection with the brake shoe and any further rotative effort on the same, in a clockwise direction, will be positively exerted on the brake drum.

This method of control is desirable when the manner of fishing is such that a drag is exerted on the line. For example, when trolling from a moving boat the lure and the line which is out exert a drag on the line which tends to cause it to unwind from the reel and thus increase the length of the line beyond that which is desired. To prevent the paying out of the line by the drag the member 67 is adjusted to yieldably press the brake shoe against the brake drum wtih a pressure which will be just sufficient to prevent the line from paying out but will not prevent the paying out of the line in case a positive pull is exerted thereon, as when a fish strikes the lure or when the line is caught in an obstruction. The amount of resistance necessary to prevent the paying out of the line depends upon the amount of drag, which in turn depends largely on the weight of the lure, the amount of line which has been payed out and the speed of the boat, and the cam is turned until the line ceases to slip and no further attention is then required until conditions change to increase the drag.

In casting the line is unwound from the reel by the weight of the lure as the latter is cast and the unwinding of the line will impart rotative momentum to the spool which will cause a continued rotation of the spool after the lure has struck the water, thus unwinding additional line which becomes slack and is apt to be entangled. To prevent this overrunning of the spool, or back lash, it is customary for the operator to press his thumb against that portion of the line which is wound on the reel at the proper time and with sufficient pressure to stop the reel at the instant the lure strikes the water. This method is difficult of accomplishment, and only an expert fisherman can successfully use the same. It has been proposed heretofore to provide means for preventing this back lash, but so far as I am informed these means all exerted a constant resistance to the rotation of the reel and thus interfered with the casting both as to distance and as to accuracy. I have provided means whereby the rotation of the spool, when a cast is made, may be quickly and accurately checked at the proper time through the medium of a thumb lever which can be easily and quickly operated by the hand that grasps the handle of the rod. For this purpose I have provided a lever comprising an arm 75 which is arranged in operative relation to the movable member 67 of the brake controlling mechanism and is thus connected with the brake shoe. When, as in the present instance, this controlling mechanism is mounted in a housing the member 67 is provided with a lug 76 which extends through and beyond a slot 77 in the closure 59 for the opening in the inner side wall 24 of the housing. The arm 75 of the lever is arranged directly below this lug and is pivotally mounted on one of the studs 63 which are mounted on the casing and extend inwardly toward the spool. The stud on which the lever is mounted depends upon the position of the frame or housing with relation to the rod, and the provision of two studs enables the lever to be properly located with the frame in either of its positions. A second arm 78 is connected with the arm 75 and extends to a position adjacent the handle in the rear of the reel. The end of this arm is at one side of the handle and to facilitate the operation of the lever there is secured to the arm 78 a stud 79 which extends across the upper portion of the handle in a position in which it may be engaged by the thumb of the hand which grasps the handle while the joint of the thumb rests upon the handle, thereby enabling the lever to be quickly and easily operated and to be very accurately controlled. The arm 78 may be rigid with the arm 75, but it is preferably adjustable with relation thereto to enable the stud 79 to be positioned according to the desires of each operator. Further, it is desirable that the arm 78 should not be of such weight as to overbalance the arm 75 and cause the latter to exert an upward pressure on the stud 76. In the present instance the lever 78 is formed of thin sheet metal and is U-shape in cross section, and the upper end portions of the side walls of the arm are pivotally supported on the stud which carries the arm 75. The adjustment of the arm 78 with relation to the arm 75 may be effected in various ways, and as here shown a lug 80 is rigidly connected with the arm 75 adjacent the axis of the latter and extends between the side walls of the U-shaped arm. An adjusting screw 81 is rotatably supported on the arm 78, as by a member 183 extending across and secured to the edges of the latter, and this screw extends through a screw threaded opening in the stud 80, so that the adjustment of the screw will move the arm 78 about its pivotal axis and thus adjust the same with relation to the arm 75. The screw is locked in its adjusted position by a nut 182.

In Fig. 17 there is shown a modified form of thumb lever in which the arm 82, which extends beneath the lug 76 is angular in form and has an upwardly inclined part 83 which is pivotally mounted on the stud 63, and a horizontal part beneath the lug 76. The second arm 84 is of a U-shaped construction similar to that of the arm 78 and is pivoted on the stud 63 for movement with relation to the first-mentioned arm. The upper end of the arm 84 is provided with a part extending along the inclined portion of the arm 82 and having a cross bar or lug 85 engaging the lower edge of the inclined part of the lever 82. Thus, the movement of the arm 84 will move the horizontal portion of the arm 82 toward the lug 76. This horizontal part of the lever is provided with a screw threaded opening in which is mounted a screw 86 which can be adjusted to position the upper end thereof in proper relation to the lug 76, the screw 86 being retained in adjusted position by a set screw 87.

It is customary to provide a reel with a so-called "click" device which serves to prevent the rotation of the spool when there is little or no pull on the line and which also produces a sound to notify the operator when the line is paying out. Such a device may be included in the present reel, if desired, and I have shown in Figs. 7 and 11 a ratchet wheel 90 rigidly secured to the rotatable shaft 43 within the housing and arranged close to the outer wall 25 thereof. This ratchet wheel has a series of relatively shallow V-shaped teeth. Cooperating with the ratchet wheel is a V-shaped pawl 91 which is pivotally supported on a stud 92 slidably mounted in a slot 93 in the wall 25 and which is provided exteriorly of the wall with a knob 94, thus permitting the pawl to be moved into and out of engagement with the teeth of the ratchet wheel. The pawl is yieldably held in an upright position by a split annular spring 95, the intermediate portion of which is secured to a block 96 on the interior of the wall 25 and the ends of which bear against the respective converging edges of the V-shaped pawl, thus retaining the pawl in an upright position but permitting it to be moved into and out of engagement with the teeth of the ratchet wheel. When the pawl is in its operative position the rotation of the spool and of the shaft 53 will rotate the ratchet wheel 90 and cause the teeth thereof to ride over the nose of the pawl, but when there is little or no pull on the line the pawl will hold the ratchet wheel against rotation and thus prevent an unintentional unwinding of the line.

While I have shown and described one embodiment of my invention, together with certain minor modifications thereof, I wish it to be understood that I do not desire to be limited to the details thereof as various modifications may occur to a person skilled in the art.

Having now fully described my invention, what I claim as new and desire to secure by Letters Patent, is:

1. A fishing reel comprising a frame, said frame including upright side walls spaced apart laterally to form a housing, a spool rotatably supported at one side of said housing, a shaft rotatably supported in said housing and drivingly connected with said spool, a brake drum secured to said shaft, an upright guideway carried by one of said side walls beneath said brake drum, a brake shoe slidably supported in said guideway, a member slidably supported in said guideway beneath said brake shoe, a spring interposed between said member and said brake shoe, said spring being compressible by said member to establish a positive connection between said member and said brake shoe, and means for actuating said member to cause said brake shoe to engage said brake drum with progressively increased yieldable pressure and then with positive pressure.

2. A fishing reel comprising a frame, said frame including upright side walls spaced apart laterally to form a housing, a spool rotatably supported at one side of said housing, a shaft rotatably supported in said housing and drivingly connected with said spool, a brake drum secured to said shaft, an upright guideway carried by one of said side walls beneath said brake drum, a brake shoe slidably supported in said guideway, a member slidably supported in said guideway beneath said brake shoe, a spring interposed between said member and said brake shoe, said spring being compressible by said member to establish a positive connection between said member and said brake shoe, means within said housing for actuating said members to cause said brake shoe to engage said brake drum with progressively increased yieldable pressure and then with positive pressure and for retaining said member in a selected position, and manually operable means mounted exteriorly of said housing for actuating said member.

3. A fishing reel comprising a frame, said frame including upright side walls spaced apart laterally to form a housing, a spool rotatably supported at one side of said housing, a shaft rotatably supported in said housing and having driving connection with said spool, a brake drum secured to said shaft, one wall of said housing having an opening, an exterior closure for said opening detachably secured to said wall and having a slot therein, a channel plate secured to and removable with said closure and forming a guideway, a brake shoe slidable in said guideway, a member slidable in said guideway below said brake shoe and having a part extending through and beyond the slot in said closure, a spring interposed between said member and said brake shoe, a cam in said housing operatively engaging said member, means supported exteriorly of said housing for actuating said cam, and a manually operable device to engage said part of said member to actuate the same independently of said cam.

EDWARD J. VON PEIN.

(References on following page)

REFERENCES CITED

The following references are of record in the file of this patent:

UNITED STATES PATENTS

| Number | Name | Date |
|---|---|---|
| 284,703 | Zschech | Sept. 11, 1883 |
| 369,622 | Titus, Jr. | Sept. 6, 1887 |
| 841,730 | Smith | Jan. 22, 1907 |
| 1,255,220 | Petry | Feb. 5, 1918 |
| 1,398,185 | Frohmuth et al. | Nov. 22, 1921 |
| 1,398,429 | Harradine | Nov. 29, 1921 |
| 1,459,567 | Avery | June 19, 1923 |
| 1,547,297 | Case | July 28, 1925 |
| 1,797,023 | Russell | Mar. 17, 1931 |
| 1,821,735 | Wharton | Sept. 1, 1931 |
| 2,034,917 | Miller | Mar. 24, 1936 |

FOREIGN PATENTS

| Number | Country | Date |
|---|---|---|
| 2,402 of 1901 | Great Britain | Jan. 23, 1902 |
| 345,872 | Great Britain | Apr. 2, 1931 |
| 469,385 | France | Mar. 19, 1914 |